Oct. 5, 1943.   J. A. HILL   2,330,972
LEAK DETECTOR
Filed July 18, 1942   2 Sheets-Sheet 1
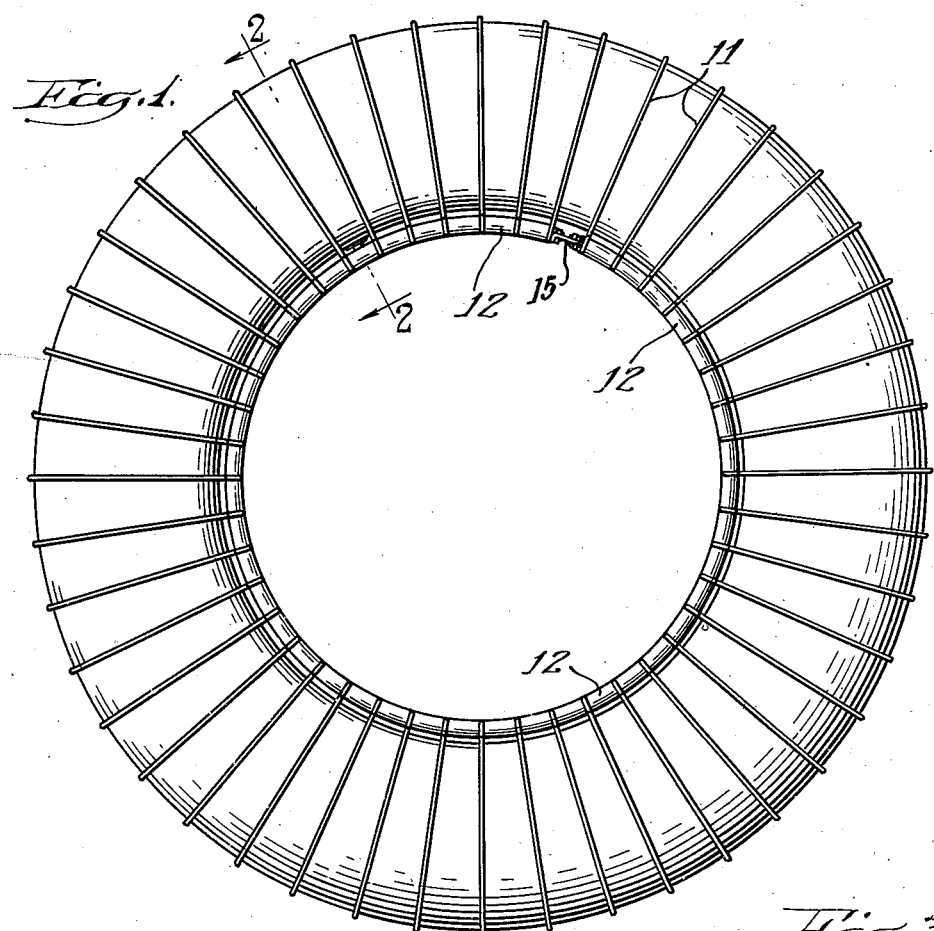
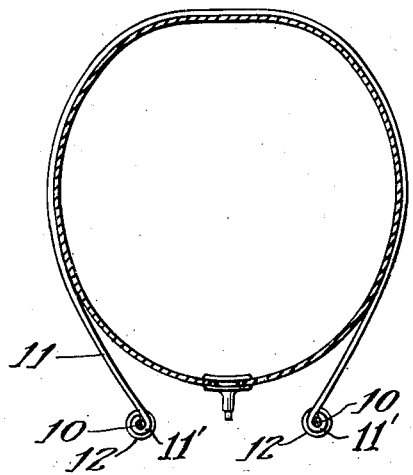
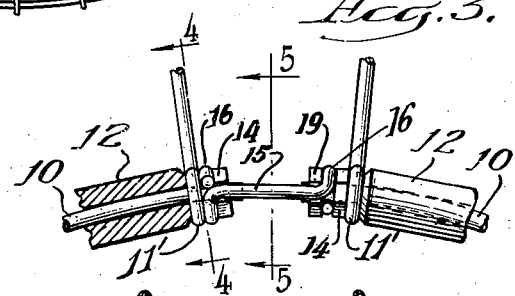
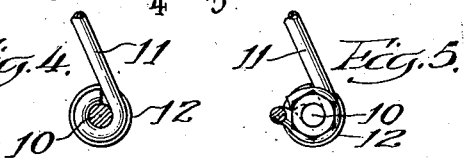
Inventor:
John A. Hill
By Eugene H. Simpson
Attorney.

Oct. 5, 1943.   J. A. HILL   2,330,972
LEAK DETECTOR
Filed July 18, 1942   2 Sheets-Sheet 2
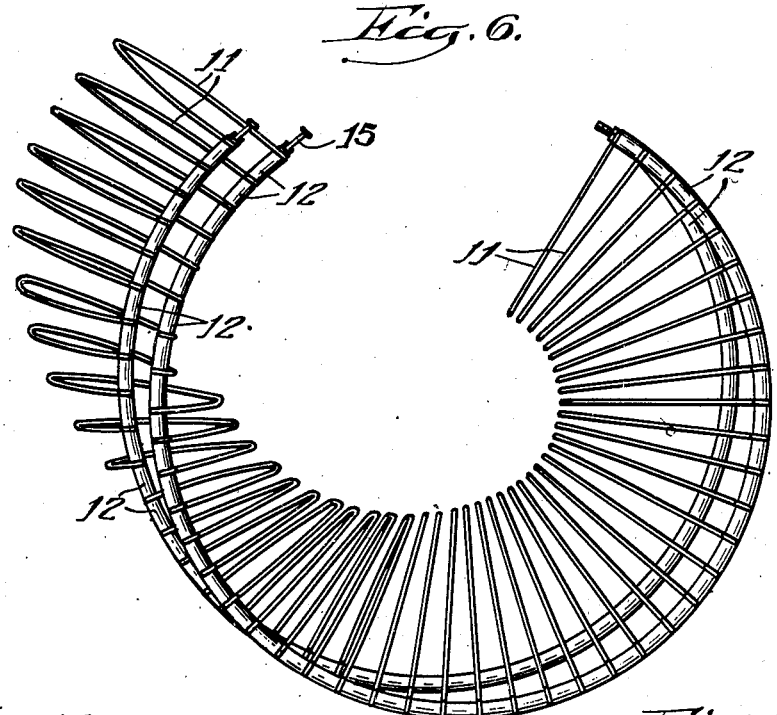
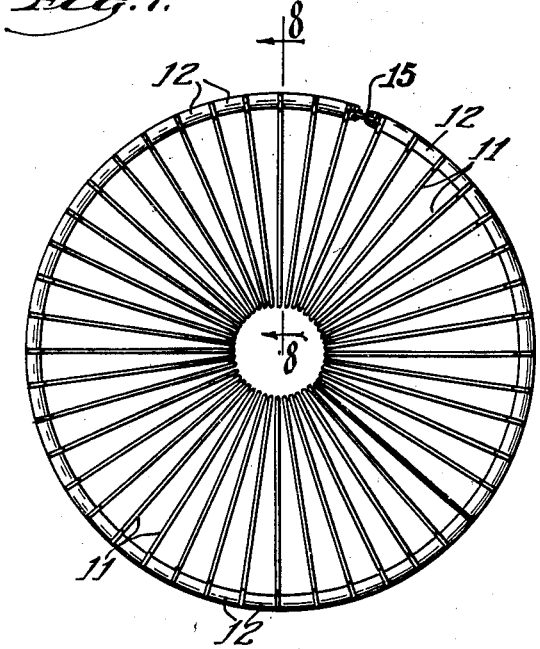
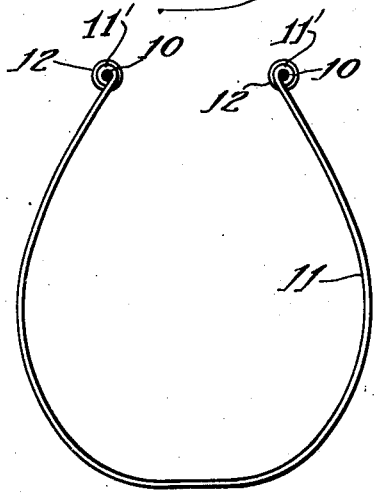

Patented Oct. 5, 1943

2,330,972

UNITED STATES PATENT OFFICE 2,330,972

LEAK DETECTOR

John A. Hill, West Allis, Wis.

Application July 18, 1942, Serial No. 451,488

2 Claims. (Cl. 73—51)

This invention relates to leak detectors for automobile inner tubes or the like.

In leak detectors heretofore devised, a woven member was placed around the inner tube, the open ends fastened and the tube inflated and immersed in water to find the leak. Such construction has the dual disadvantage of being high in initial cost, and of taking a considerable time to apply to and remove from the tube.

One object of the present invention is to devise a leak detector which may be more readily applied to and removed from an inner tube.

Another object is to provide a leak detector which can be more conveniently shipped and stored than those now in use.

A further object of the present invention is to provide a leak detector which is more economical to manufacture than those now in use.

A further object is to provide a leak detector which will not require fastening around the circumference of the tube.

Further objects will become apparent from the following specification which, when taken in connection with the accompanying drawings illustrate one form of the invention.

In the drawings:

Fig. 1 is a plan view of the leak detector with an inner tube in place;

Fig. 2 is a transverse cross-section taken on the line 2—2 of Fig. 1;

Fig. 3 is a detail of the connecting link;

Figs. 4 and 5 are cross-sections taken on the lines 4—4 and 5—5, respectively, of Fig. 3;

Fig. 6 is a plan view showing the leak detector being turned inside-out for shipping or storage;

Fig. 7 shows the leak detector turned inside-out for shipping or storage; and

Fig. 8 is a cross-section on the lines 8—8 of Fig. 7.

Referring to the drawings, in which like numerals indicate like parts throughout the several views, the leak detector comprises a pair of spaced parallel wire rings 10, upon which are mounted a plurality of substantially horseshoe-shaped wire loops 11, having eyes 11' formed on each end through which the rings 10 are passed, the loops being held spaced from each other by spacer sleeves 12.

The rings 10 are made of relatively heavy wire bent in circular form and threaded at the ends. A retaining nut 14 is screwed on each of the threaded ends to retain the loops 11 and the sleeves 12 in place. The ends of each of the rings 10 are held together by links 15, which consist of wires having body portions with eyes 16 formed on the opposite ends and extending at right angles to the body portions and engageable over the threaded ends of the rings 10. The links 15 are retained permanently on one of the ends of the rings 10 by one of the nuts 14, which is riveted in place in order to prevent disassembly of the detector. The opposite ends of the links 15 are connected to the opposite ends of the wire rings 10 by nuts 19 which are screw threaded on the ends of the rings 10.

Operation

In order to conserve space and to eliminate packaging difficulties, the leak detectors are shipped with the loops 11 on the inside of the rings 10, as shown in Fig. 7. In this position the detector occupies less space and does not have to be packed in individual cartons.

To set up the leak detector for use the nuts 19 are removed and the ends of the rings 10 allowed to separate. By starting at one end of the open rings 10, the loops 11 may (as shown in Fig. 6) be rolled out successively until all loops 11 are on the outside of the rings 10. The rings 10 are then drawn together and secured by the link 15 and nut 19. The leak detector is then ready for use.

When an inner tube of an automobile or like tire has a slow leak, which can not be detected without the application of pressure to the tube, the tube is placed in the leak detector as shown in Figs. 1 and 2 and the tube inflated.

The loops of the leak detector provide ample support for the tube and prevent its failure in any portion which may be weakened. The tube then may be immersed in water and the leak detected.

Since the inner ends of the loops 11 are not connected together, the rings 10 are adapted to spread apart as air enters the inner tube being tested. Thus the tube is susceptible of limited expansion which permits the hole therein to expand and so be more readily detected without the application of undue pressure in the inner tube.

Having thus described the invention it is realized that it is susceptible to various changes and modifications coming within the scope of the appended claims. It is not therefore, desired to limit the invention to the precise form herein shown and/or described, but only by the scope of the appended claims.

The invention is hereby claimed as follows:

1. A high pressure leak detector comprising, a pair of substantially circular parallel open rings, means to connect the open ends of said rings together to form the same into complete circles, a plurality of substantially horseshoe-shaped yieldable wire loops having eyes formed at the opposite ends thereof and interconnecting said parallel rings, and spacers mounted on said rings between the loops to maintain the loops in spaced relationship.

2. A high pressure leak detector comprising, a pair of substantially circular parallel open rings, means to connect the open ends of said rings together to form the same into two complete circles, a plurality of substantially horseshoe-shaped yieldable wire loops having eyes formed at the opposite ends thereof and interconnecting the parallel rings and normally retaining the rings spaced for the insertion of the article to be tested and spacers mounted on said rings between the loops to retain the loops in spaced relationship.

JOHN A. HILL.